United States Patent
Macdonald et al.

(10) Patent No.: US 9,420,410 B2
(45) Date of Patent: Aug. 16, 2016

(54) MANAGING WIRELESS VOICE AND DATA COMMUNICATIONS

(71) Applicant: General Motors LLC, Detroit, MI (US)

(72) Inventors: Andrew J. Macdonald, Grosse Pointe Park, MI (US); David George, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 163 days.

(21) Appl. No.: 14/022,340

(22) Filed: Sep. 10, 2013

(65) Prior Publication Data

US 2015/0072668 A1    Mar. 12, 2015

(51) Int. Cl.
*H04W 4/02* (2009.01)
*H04W 4/14* (2009.01)
*H04W 88/06* (2009.01)
*H04W 4/04* (2009.01)
*H04L 12/851* (2013.01)
*H04W 4/16* (2009.01)

(52) U.S. Cl.
CPC ............... *H04W 4/02* (2013.01); *H04L 47/24* (2013.01); *H04W 4/043* (2013.01); *H04W 4/14* (2013.01); *H04W 4/046* (2013.01); *H04W 4/16* (2013.01); *H04W 88/06* (2013.01)

(58) Field of Classification Search
CPC ... H04W 4/04; H04W 4/046; H04W 52/0241; H04W 24/04; H04W 48/18; H04W 4/12; H04W 4/16; H04W 4/24; H04W 60/04; H04W 64/00; H04W 76/027; H04W 88/02; H04W 8/18; H04W 8/24

USPC ......... 455/47.9, 469.2, 99, 152.1, 238.1, 297, 455/340, 460, 435.2, 67.11, 404.1, 404.2, 455/419; 701/1, 36

See application file for complete search history.

(56) References Cited

U.S. PATENT DOCUMENTS

| | | | |
|---|---|---|---|
| 6,112,084 A * | 8/2000 | Sicher et al. .................. 370/337 |
| 2007/0167147 A1 * | 7/2007 | Krasner et al. ............. 455/404.2 |
| 2012/0244850 A1 * | 9/2012 | Doherty et al. ............... 455/418 |
| 2013/0044603 A1 * | 2/2013 | Macias et al. ................. 370/241 |
| 2013/0252649 A1 * | 9/2013 | Siomina et al. .............. 455/466 |
| 2013/0331073 A1 * | 12/2013 | Balan et al. ................... 455/415 |
| 2014/0128072 A1 * | 5/2014 | Yi et al. ..................... 455/435.3 |

* cited by examiner

*Primary Examiner* — Kamran Afshar
*Assistant Examiner* — Ather Mohiuddin
(74) *Attorney, Agent, or Firm* — Christopher DeVries; Reising Ethington P.C.

(57) ABSTRACT

A method of controlling wireless voice and data communications includes identifying a radio access technology (RAT) in use at a vehicle telematics unit; establishing a wireless connection between the vehicle telematics unit and a central facility; wirelessly transmitting the identity of the RAT from the vehicle telematics unit to the central facility; receiving a message at the vehicle telematics unit from the central facility based on the identity of the RAT causing the vehicle telematics unit to: carry out simultaneous voice and data communications over a single wireless connection with the central facility when the identified RAT supports simultaneous voice and data communications; and establish a voice call with the central facility and receive data via short message service (SMS) messages when the identified RAT does not support simultaneous voice and data communications.

20 Claims, 2 Drawing Sheets

MANAGING WIRELESS VOICE AND DATA COMMUNICATIONS

TECHNICAL FIELD

The present invention relates to managing wireless voice and data communications and more particularly to identifying a radio access technology (RAT) used at a vehicle telematics unit and determining how to communicate with the vehicle telematics unit based on the RAT.

BACKGROUND

Many vehicles include a vehicle telematics unit that can both monitor vehicle functions and carry out communications at the vehicle. In the past, the vehicle telematics unit may have been capable of communicating using only one cellular standard. As the vehicle moves, the vehicle telematics unit may lose its ability to communicate because the wireless carrier system servicing the local area may employ a cellular standard that does not match the one used by the vehicle telematics unit. In contrast, more modern vehicle telematics units have the ability to communicate using multiple cellular standards. As modern vehicle telematics units move and encounter different cellular standards, vehicle telematics units having the ability to communicate using multiple cellular standards can facilitate communications when older telematics units capable of only one cellular protocol could not.

However, the multiple cellular standards used by modern vehicle telematics units have created new challenges for telematics subscriber systems using central facilities to contact vehicles. As a result, it is helpful to manage wireless communications based on the cellular standards.

SUMMARY

According to an embodiment of the invention, there is provided a method of controlling wireless voice and data communications. The method includes identifying a radio access technology (RAT) in use at a vehicle telematics unit; establishing a wireless connection between the vehicle telematics unit and a central facility; wirelessly transmitting the identity of the RAT from the vehicle telematics unit to the central facility; receiving a message at the vehicle telematics unit from the central facility based on the identity of the RAT causing the vehicle telematics unit to: carry out simultaneous voice and data communications over a single wireless connection with the central facility when the identified RAT supports simultaneous voice and data communications; and establish a voice call with the central facility and receive data via short message service (SMS) messages when the identified RAT does not support simultaneous voice and data communications.

According to another embodiment of the invention, there is provided a method of controlling wireless voice and data communications. The method includes receiving at a central facility the identity of a radio access technology (RAT) in use at a vehicle telematics unit; determining whether the received RAT identity supports simultaneous voice and data communications over a single wireless connection; transmitting a message to the vehicle telematics unit that causes the vehicle telematics unit to: carry out simultaneous voice and data communications over a single wireless connection when the RAT identity supports simultaneous voice and data communications; establish a voice call with the central facility and receive data communications via short message service (SMS) messages when the identified RAT does not support simultaneous voice and data communications.

According to yet another embodiment of the invention, there is provided a method of controlling wireless voice and data communications. The method includes wirelessly receiving at a central facility the identity of a radio access technology (RAT) in use at a vehicle telematics unit and a vehicle location; searching a database containing a plurality of geographic locations and RATs available at each of the geographic locations for the vehicle location; determining, when the received vehicle location matches a geographic location in the database, that the RAT available at the matched geographic location is the same as the received identity of the RAT in use at the vehicle telematics unit; and transmitting a message to a vehicle owner when the RAT available at the matched geographic location does not match the identity of the RAT in use at the vehicle telematics unit.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The method and system described below control a call flow between a central facility and a vehicle depending on the radio access technology (RAT) used at a vehicle telematics unit. Depending on the RAT in use at the vehicle, different call flows may be used to exchange voice and data between the vehicle and the central facility. For example, if the vehicle telematics unit at the vehicle is using a RAT that supports simultaneous voice and data (SVD) voice and data communications over a cellular or wireless call/connection, the vehicle telematics unit 30 can alert the central facility, which can then communicate data with the vehicle using an initial call/wireless connection or a single call. On the other hand, if the vehicle telematics unit determines that it is using a RAT that does not support SVD, the unit can alert the central facility of this condition and the central facility can carry out voice communications between it and the vehicle using a cellular call. At the same time, the central facility can communicate data with the vehicle telematics unit using short message system (SMS) messages while the cellular voice call is established. The central facility can also know the data transmission rate possible for cellular calls carried out using SVD cellular standards and non-SVD standards and based on those data rates make determinations whether a particular telematics service is possible given the available data rate. In this method/system, the central facility can know the communication capabilities of the vehicle telematics unit it is contacting and contact that unit accordingly.

Previously, in systems that do not know the RAT used by the vehicle telematics unit, the central facility may treat all communications with a vehicle uniformly. This result in a number of inefficiencies, such as increases in airtime usage, telematics advisor response time, and amount of time advisors spend per call. That is, without knowing the RAT used by the vehicle telematics unit, the central facility may contact the unit as though it uses a RAT that supports SVD and wait a period of time to determine if the unit responds. When contacting vehicle telematics units that do not support SVD, the central facilities may wait a significant amount of time (e.g., 30 seconds) before determining that such communications are not possible. By knowing the RAT used at the vehicle telematics unit before initiating communications, the central facility can help improve response time.

Figure 1:
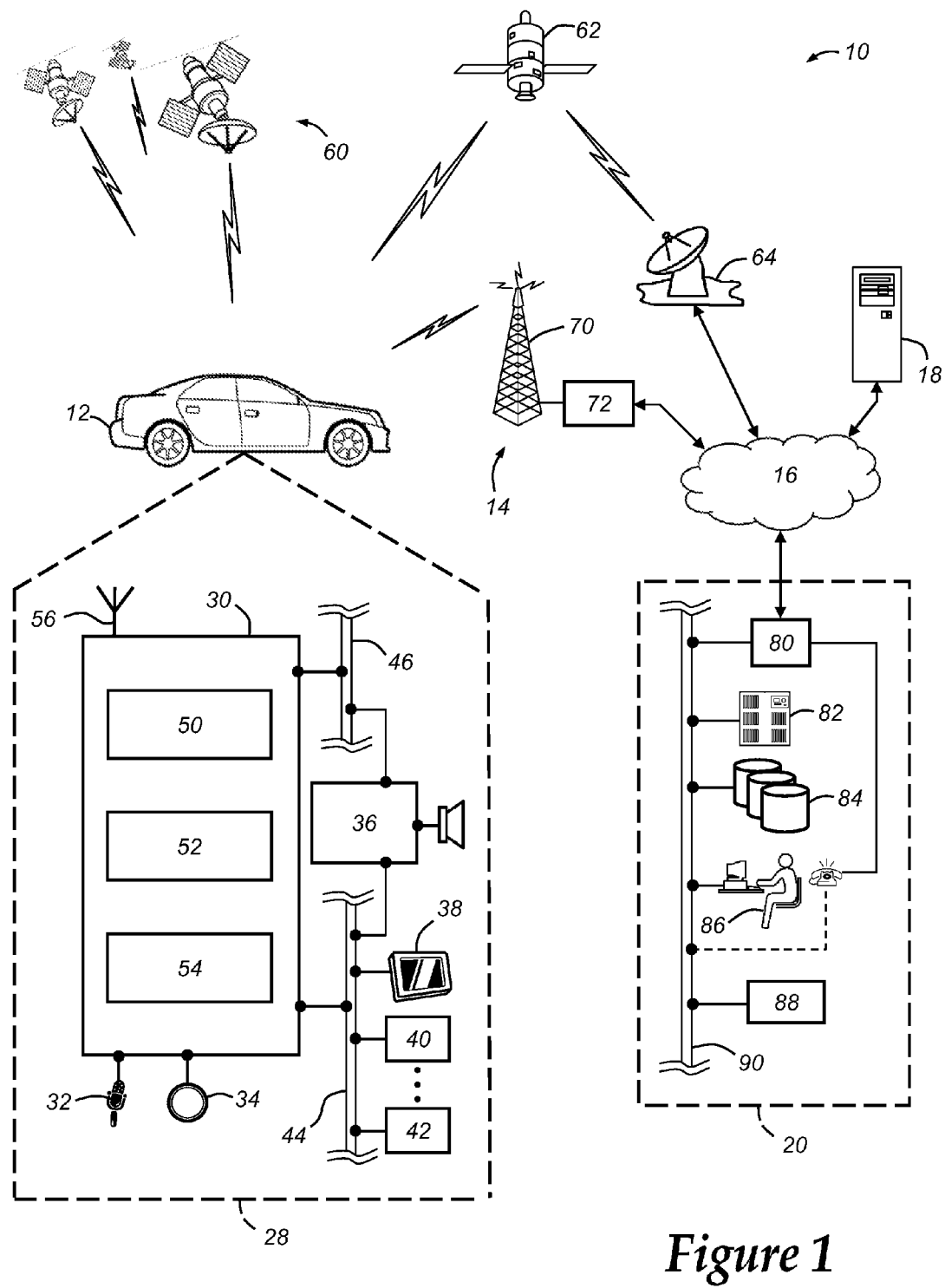
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver.

Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Wireless carrier system 14 can implement any suitable communications technology, including for example, analog technologies such as AMPS, or the newer digital technologies such as CDMA (e.g., CDMA2000 or 1EX-DO) or GSM/GPRS (HSPA). These technologies may also be commonly referred to as "2G," "3G," or "4G" cellular standards which may or may not permit SVD communications. For example, 4G cellular standards (e.g., LTE and WCDMA) generally support cellular calls that permit the transmission of both voice and data communications over a single cellular call or wireless connection at the same time. These cellular standards can support SVD communications. In contrast, 2G or 3G CDMA cellular standards may permit voice communications over a cellular call or data communications over the cellular call but not both voice and data at the same time. In general, these cellular standards do no support SVD communications. These examples of cellular standards are not exhaustive and one of ordinary skill in the art will appreciate that other cellular standards can be identified as supporting or not supporting SVD communications.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
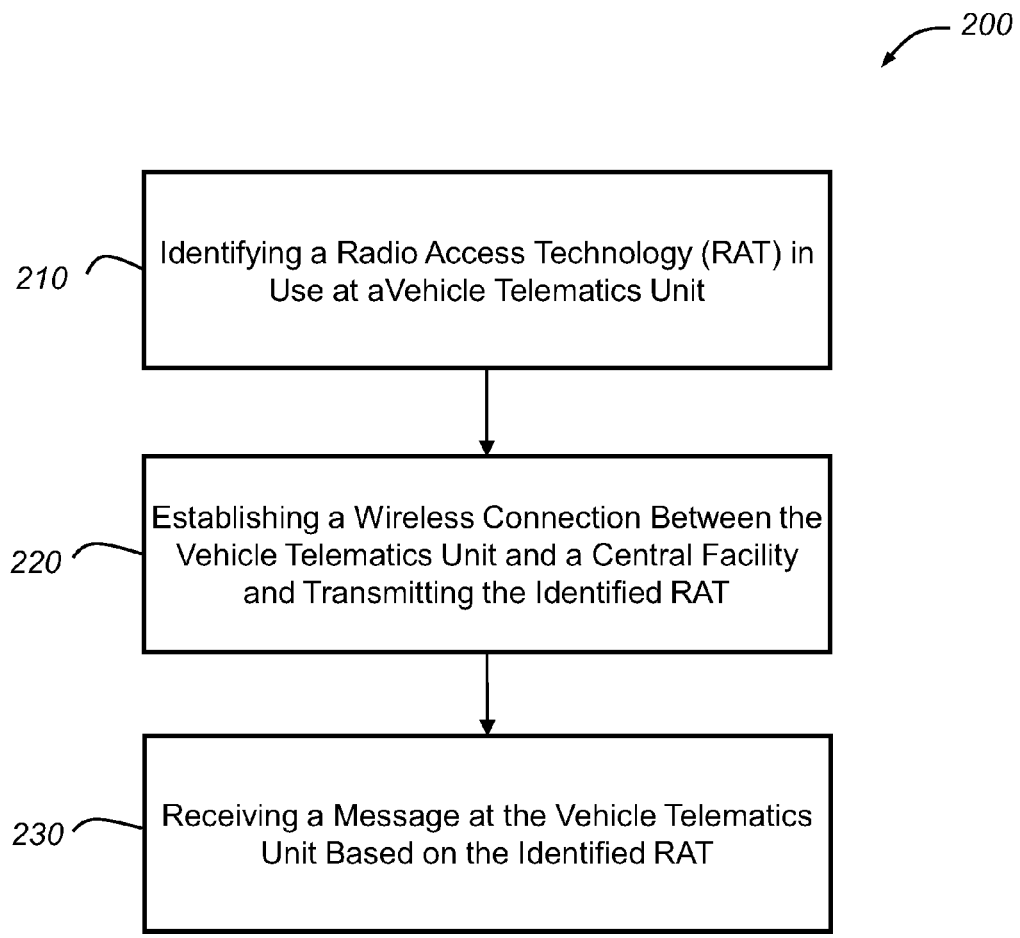
FIG. 2 is a flow chart of an implementation of the method of controlling wireless voice and data communications.

Turning now to FIG. 2, there is shown a method 200 of controlling wireless voice and data communications. The method 200 begins at step 210 by identifying a radio access technology (RAT) in use at the vehicle telematics unit 30. When a vehicle occupant initiates a wireless call from the vehicle telematics unit 30 to the central facility, the initiation of this call can cause transmission of a segment of data that precedes the call. The segment of data can identify one or more call variables, such as a vehicle identifier, a station identifier, a vehicle location, and/or a RAT used at the vehicle telematics unit 30. The vehicle identifier can be a vehicle identification number (VIN) that is stored at the vehicle 12. The station identifier can be a Station ID (STID), a Mobile Identification Number (MIN), a Mobile Dialed Number (MDN), an Electronic Serial Number (ESN), an International Mobile Subscriber Identity (IMSI), or similar identifier as known to those skilled in the art. The vehicle location can be latitude and longitude coordinates that are obtained from the GPS module 40 that is in communication with the vehicle telematics unit 30. And the central facility described in method 200 can be described in terms of the call center 20 but it should be appreciated that other elements can fulfill the role of central facility, such as a back office center represented by computer 18.

The RAT can be identified by the vehicle telematics unit 30 using a variety of techniques. In one example, the identity of the RAT can be obtained from a cellular chipset used by the vehicle telematics unit 30. That is, the cellular chipset can report the RAT or RATs that the chipset is capable of communication using. This information can be obtained from the chipset and included with the segment of data sent from the vehicle telematics unit 30 to the call center 20 (or other central facility). However, the RAT used at the vehicle telematics unit 30 can be obtained in other ways as well. In another example, the vehicle telematics unit 30 can obtain the RAT presently used from the base station it is camped on. A base station (e.g., cell tower 70) can broadcast a signal that uses one of the cellular standards (e.g., 3G or 4G). When the cellular chipset of the vehicle telematics unit 30 communicates with the base station of the wireless carrier system 14, the unit 30 can determine the cellular standard or RAT used by the base station the unit 30 has camped on. The vehicle telematics unit 30 can then use the cellular standard or RAT determined from the base station and include it with the segment of data sent from the vehicle telematics unit 30. The method 200 proceeds to step 220.

At step 220, a wireless connection is established between the vehicle telematics unit 30 and a central facility, and the identity of the RAT is wirelessly transmitted from the vehicle telematics unit 30 to the central facility. As discussed above, once the identity of the RAT is determined at the vehicle telematics unit 30, the identity can be transmitted with the segment of data before the cellular call between the vehicle telematics unit 30 and the central facility. Or in another implementation, it is possible to first establish a cellular call between the vehicle telematics unit 30 and the central facility and then transmit the RAT over the cellular call. The method 200 proceeds to step 230.

At step 230, a message is received at the vehicle telematics unit 30 from the central facility based on the identity of the RAT. Once the central facility knows the identity of the RAT used at the vehicle telematics unit 30, the central facility can determine how to communicate with the vehicle telematics unit 30 based on the RAT identity. When the identified RAT supports SVD communications, the central facility can communicate with the vehicle telematics unit 30 using simultaneous voice and data communications over a single wireless connection. In this case, the message received by the vehicle telematics unit 30 can be the data sent along with voice communications over the single wireless connection (e.g., a cellular call) as part of a telematics service. When the identified RAT does not support SVD communications, the central facility can establish a voice call with the vehicle telematics unit 30 over which voice communications can be carried out. In addition to this call, the central facility can transmit data messages to the vehicle telematics unit 30 in the form of short message service (SMS) messages. It should be appreciated that the SMS messages can include a request for data or other computer-executable command. Thus, along with voice communications over the voice call, the central facility can send and receive data via SMS messages when the identified RAT does not support simultaneous voice and data communications.

The method 200 can also include searching a database containing a plurality of geographic locations and the RATs available at each of those geographic locations. Comparing the RATs theoretically available at a geographic location with the identity of the RAT actually used by the vehicle telematics unit 30 at the geographic location can help identify malfunctioning vehicle telematics units 30. For example, when the identity of the RAT actually used at the vehicle telematics unit 30 is a 3G cellular protocol while the RATs theoretically available at the geographic location matching the vehicle location include 4G cellular standards, there may be a problem at the vehicle 12 preventing the vehicle telematics unit 30 from communicating via the 4G standard. When the segment of data transmitted as part of call initiation includes the vehicle location along with the RAT used at the vehicle telematics unit 30, the database can be searched to determine if the received vehicle location matches one of the geographic locations in the database. And when the received vehicle location matches a geographic location in the database, it can be determined whether the RAT(s) available at the geographic location matching the vehicle location is/are the same as the received identity of the RAT in use at the vehicle telematics unit 30. The database and the computer processing capability of searching the database can be carried out at the central facility, such as the computer 18 or call center 20, or using another configuration in which the database is maintained at one location (e.g., a cloud server) that is accessed from the central facility.

When the RAT used by the vehicle telematics unit 30 differs from the RATs theoretically available at the geographic location, the central facility can carry out one or more actions based on this condition. For instance, the central facility can attempt to remotely diagnose the problem(s) at the vehicle 12 using vehicle diagnostic tests that are initiated away from the vehicle 12. The central facility can also generate a message based on this condition. The message can be transmitted to a vehicle owner or other person in control of the vehicle (e.g., a lessee) alerting them that the RAT available at the matched geographic location does not match the identity of the RAT in use at the vehicle telematics unit 30. This message can include information explaining the problem and the identity of a vehicle service facility where the vehicle owner can have this problem investigated more thoroughly. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling wireless voice and data communications, comprising the steps of:
  (a) identifying a radio access technology (RAT) in use at a vehicle telematics unit;
  (b) establishing a wireless connection between the vehicle telematics unit and a central facility;
  (c) wirelessly transmitting the identity of the RAT from the vehicle telematics unit to the central facility;
  (d) receiving a message at the vehicle telematics unit from the central facility based on the identity of the RAT causing the vehicle telematics unit to:
    (d1) carry out simultaneous voice and data communications over a single wireless connection with the central facility when the identified RAT supports simultaneous voice and data communications; and
    (d2) establish a voice call with the central facility and receive data via short message service (SMS) messages when the identified RAT does not support simultaneous voice and data communications.

2. The method of claim 1, wherein the SMS messages are received while the voice call is established.

3. The method of claim 1, further comprising the step of wirelessly transmitting the identity of the RAT along with a location of the vehicle telematics unit.

4. The method of claim 3, further comprising the step of wirelessly transmitting a vehicle identifier or station identifier with the identity of the RAT and location of the vehicle telematics unit.

5. The method of claim 1, wherein the identity of the RAT is wirelessly transmitted before establishing the single wireless connection or the voice call between the vehicle telematics unit and the central facility.

6. The method of claim 1, further comprising the step of obtaining the identity of the RAT from a cellular chipset used by the vehicle telematics unit.

7. The method of claim 1, further comprising the step of obtaining the identity of the RAT from a base station the vehicle telematics unit is camped on.

8. A method of controlling wireless voice and data communications, comprising the steps of:
  (a) receiving at a central facility the identity of a radio access technology (RAT) in use at a vehicle telematics unit;
  (b) determining whether the received RAT identity supports simultaneous voice and data communications over a single wireless connection;
  (c) transmitting a message to the vehicle telematics unit that causes the vehicle telematics unit to:
    (c1) carry out simultaneous voice and data communications over a single wireless connection when the RAT identity supports simultaneous voice and data communications;
    (c2) establish a voice call with the central facility and receive data communications via short message service (SMS) messages when the identified RAT does not support simultaneous voice and data communications.

9. The method of claim 8, wherein the SMS messages are received while the voice call is established.

10. The method of claim 8, further comprising the step of receiving the identity of the RAT along with a location of the vehicle telematics unit.

11. The method of claim 10, further comprising the step of receiving a vehicle identifier or station identifier with the identity of the RAT and the location of the vehicle telematics unit.

12. The method of claim 8, wherein the identity of the RAT is wirelessly transmitted before establishing the single wireless connection or the voice call between the vehicle telematics unit and the central facility.

13. The method of claim 8, wherein the identity of the RAT in use at a vehicle telematics unit is obtained from a cellular chipset used by the vehicle telematics unit.

14. The method of claim 8, wherein the identity of the RAT in use at a vehicle telematics unit is obtained from a base station the vehicle telematics unit is camped on.

15. The method of claim 8, further comprising the steps of:
   identifying a data rate associated with the identity of the RAT; and
   determining that a service is possible based on the data rate.

16. A method of controlling wireless voice and data communications, comprising the steps of:
   (a) wirelessly receiving at a central facility the identity of a radio access technology (RAT) in use at a vehicle telematics unit and a vehicle location;
   (b) searching a database that includes a plurality of geographic locations and RATs available at each of the geographic locations for the vehicle location;
   (c) determining, when the received vehicle location matches a geographic location in the database, that the RAT available at the matched geographic location is the same as the received identity of the RAT in use at the vehicle telematics unit; and
   (d) transmitting a message to a vehicle owner when the RAT available at the matched geographic location does not match the identity of the RAT in use at the vehicle telematics unit.

17. The method of claim 16, further comprising the step of wirelessly transmitting the identity of the RAT and the vehicle location along with a vehicle identifier or station identifier.

18. The method of claim 16, wherein the identity of the RAT in use at a vehicle telematics unit is obtained from a cellular chipset used by the vehicle telematics unit.

19. The method of claim 16, wherein the identity of the RAT in use at a vehicle telematics unit is obtained from a base station the vehicle telematics unit is camped on.

20. The method of claim 16, wherein the vehicle location is obtained from a global positioning service (GPS) module installed on a vehicle.

* * * * *